(12) United States Patent
Mergen

(10) Patent No.: US 8,424,096 B2
(45) Date of Patent: Apr. 16, 2013

(54) COLOR BASED NETWORK SECURITY

(75) Inventor: John-Francis Mergen, Baltimore, MD (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 1130 days.

(21) Appl. No.: 11/488,552

(22) Filed: Jul. 18, 2006

(65) Prior Publication Data
US 2008/0034431 A1 Feb. 7, 2008

(51) Int. Cl.
*G06F 21/00* (2006.01)

(52) U.S. Cl.
USPC .............. 726/26; 726/13; 726/25; 713/166; 380/33; 455/450; 705/325; 709/224; 709/225

(58) Field of Classification Search .............. 726/23, 726/27, 26
See application file for complete search history.

(56) References Cited

U.S. PATENT DOCUMENTS

| | | | | | |
|---|---|---|---|---|---|
| 4,891,504 | A | * | 1/1990 | Gupta | 235/375 |
| 5,305,402 | A | * | 4/1994 | Hill et al. | 385/25 |
| 5,812,709 | A | * | 9/1998 | Arai et al. | 385/16 |
| 5,920,058 | A | * | 7/1999 | Weber et al. | 235/457 |
| 6,535,313 | B1 | * | 3/2003 | Fatehi et al. | 398/101 |
| 6,853,811 | B2 | * | 2/2005 | Wahler et al. | 398/7 |
| 7,016,378 | B1 | * | 3/2006 | Dasika et al. | 370/535 |
| 7,027,733 | B2 | * | 4/2006 | Feuer et al. | 398/72 |
| 7,286,759 | B1 | * | 10/2007 | Sridhar et al. | 398/43 |
| 7,394,985 | B1 | * | 7/2008 | Wang et al. | 398/75 |
| 7,418,209 | B2 | * | 8/2008 | Salamon et al. | 398/185 |
| 7,534,115 | B2 | * | 5/2009 | Murano et al. | 439/138 |
| 2003/0021525 | A1 | * | 1/2003 | Turpin et al. | 385/24 |
| 2003/0025964 | A1 | * | 2/2003 | Herz et al. | 359/124 |
| 2004/0037330 | A1 | * | 2/2004 | Ohkuma | 370/535 |
| 2005/0138110 | A1 | * | 6/2005 | Redlich et al. | 709/201 |
| 2005/0158055 | A1 | * | 7/2005 | Fukushima | 398/152 |
| 2005/0160171 | A1 | * | 7/2005 | Rabie et al. | 709/227 |
| 2005/0185967 | A1 | * | 8/2005 | Hoshida | 398/173 |
| 2005/0254654 | A1 | * | 11/2005 | Rockwell et al. | 380/270 |
| 2006/0041936 | A1 | * | 2/2006 | Anderson et al. | 726/11 |

FOREIGN PATENT DOCUMENTS

| | | |
|---|---|---|
| EP | 0684713 | 11/1995 |
| EP | 1420608 | 5/2004 |
| WO | WO94/07340 | 3/1994 |

OTHER PUBLICATIONS

Pieper et al., "Secure optical communications using wavelength tunable optical filters", System Theory, 1997., Proceedings of the Twenty-Ninth Southeastern Symposium on, Date of Conference: Mar. 9-11, 1997, pp. 261-265.*
International Search Report dated Feb. 1, 2008 (1 page).

\* cited by examiner

*Primary Examiner* — Morshed Mehedi

(57) ABSTRACT

A network is configured to transmit data using only one color, the one color being associated with a community of interest. At least one network device is attached to the network, the at least one network device being associated with the community of interest and configured to receive data from the network using only the one color.

21 Claims, 3 Drawing Sheets

COLOR BASED NETWORK SECURITY

BACKGROUND INFORMATION

Information classifications, i.e., categorizations of information according to varying levels of confidentiality that may be applied to information, are common in a variety of settings, e.g., corporate, government, etc. Different levels of security may be applied to different classifications of documents, that is, different classifications of documents may be made available to different communities of interest. For example, "unclassified" documents may be available to the general public, while "secret" documents may be available only to members of a certain organization, and "top secret" documents may be limited to a subset of members of the organization. Problems in protecting the security of classified documents can arise when documents having different classifications, e.g., unclassified, secret, and top secret, are stored, transmitted, or viewed using an electronic network or networks.

When different levels of security are maintained for electronic documents in a single facility, e.g., unclassified, secret, and top secret, network data paths are often physically separated to prevent the commingling of information, and to prevent persons not belonging to the proper community of interest from accessing classified information. However, in a networked environment, different classifications of information can be commingled or improperly accessed when a device, e.g., a personal computer, a server computer, etc., intended to store or receive a first classification of information, is unplugged from a network dedicated to that first classification of information, and is then plugged into a network dedicated to a second classification of information. Under such a scenario, any information formerly available over the first network may now be available over the second network. Thus, if the first network is a top secret network and the second network is an unclassified network, top secret information could be made available via the unclassified network to persons outside of a top secret community of interest.

In some facilities that use or store information having different classification levels segregated according to distinct physical networks, plugs and connectors of different types are used for the different networks. Further, sometimes network hubs and routers belonging to networks dedicated to different classifications are placed a predetermined distance apart, this distance being greater than the length of cables that are used to connect devices to networks in a facility. For example, network hubs for network first and second networks, respectively, may be placed six feet apart, and patch cables of no longer than five feet may be used in a facility. Accordingly, information may be limited to each network based on their physical separation, but if the physical distance between the first and second networks is diminished, an unauthorized network device may be connected to a network and information may be transmitted from the first network to the second network or vice versa.

Thus, use of physical separation provides some protection against inadvertent or intentional improper disclosure of classified information, but such protection is both incomplete, and inconvenient. For one thing, it is possible to bring cables supporting different plugs and connectors into a facility. Protections against improper dissemination of classification can be overcome by use of such cables. Moreover, it is generally inconvenient and inexpensive to maintain different kinds of cables and connectors in a single facility.

Further, in facilities where a physical distance separating devices belonging to different networks is used to prevent improper dissemination of classified information, it is often too easy to move devices closer to one another, or to obtain longer cables, in order to circumvent the physical separation that prevents improper dissemination of information.

DETAILED DESCRIPTION OF THE PREFERRED EMBODIMENTS

It is to be understood that the term "color" as used herein refers to a wavelength of an emission, or transmission, in the electromagnetic spectrum, such as a light transmission, but not necessarily limited to visible light. Therefore that the terms "color" and "wavelength" are used interchangeably herein.

One or more networks may be established that transmit and receive data using only a single color, i.e., wavelength, or single color pair. A single color pair requires network devices to use one color for transmitting data and one color for receiving data. By requiring network devices to use a network interface card (NIC) or the like that is manufactured to be able to send or receive data using a single color, it is possible to prevent devices lacking such a specially manufactured NIC from accessing the network, thereby providing security protections for a community of interest using the network. For example, it is possible to restrict classified documents to a network associated with a community of interest by the wavelength of transmission on a network, thereby decreasing risk that classified documents will be accessed by persons outside of an authorized community of interest.

Figure 1:
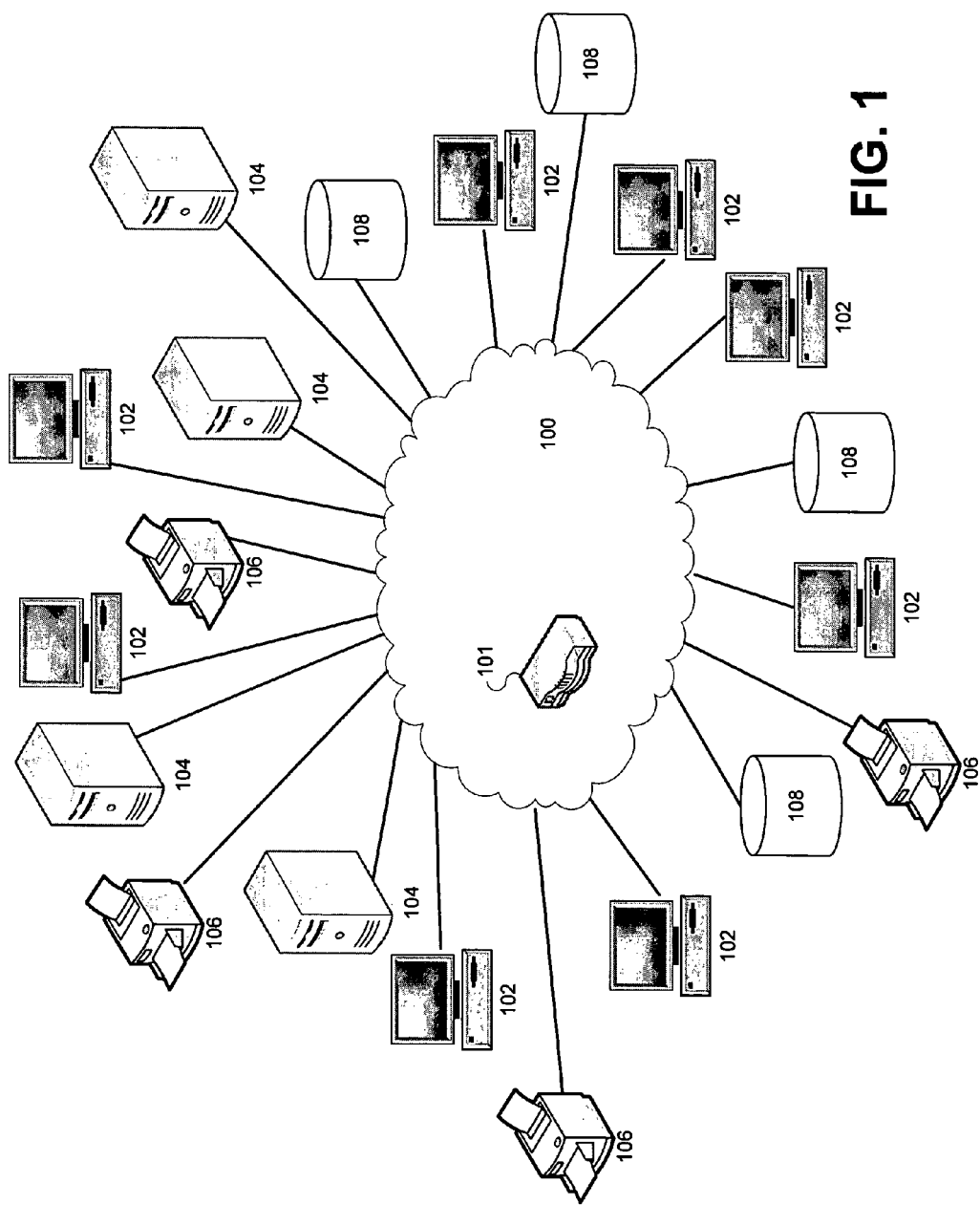
FIG. 1 illustrates a network, according to an embodiment.

FIG. 1 provides an exemplary illustration of an optical network 100, according to an embodiment. Network 100 is preferably a broadband packet switched data network, such as an Internet Protocol (IP) network, and generally uses known fiber optic connections. Headend 101 is well known for use in broadband networks such as local area networks (LANs), etc. Headend 101 generally provides control functions for a network such as message management, modulating and remodulating data transmissions, etc. It will be understood that network 100 generally employs a tree topology, and, accordingly, headend 101 serves as a central point for sending and receiving all messages in network 100; that is, all messages in network 100 must pass through headend 101 to be sent or received.

A plurality of devices are attached network 100, such as personal computers 102, server computers 104, printers 106, databases 108, etc. To accommodate various devices connected to network 100, headend 101 may transmit data on a plurality of different wavelengths, i.e., colors. For example, some optical networks may use between fifty and one hundred different colors for transmitting data. Advantageously, according to present embodiments, headend 101 is configured to send and receive data using only a limited number of colors. Indeed, in certain presently preferred embodiments, headend 101 is configured to emit only a single predetermined color, although it is to be understood that embodiments are possible in which headend 101 is configured to emit two or more predetermined colors. Similarly, headend 101 may be configured only to receive a single color, or may be configured to receive two or more specific colors.

Various ways of configuring headend 101 to emit only predetermined colors may be used. It will be understood that such configurations may be performed electronically or may be determined by physical properties of an emitting device. The optoelectronic or physical components of an electronic oscillator can be created in a manner that limits its ability to tune to another wavelength. For example, doping techniques may be employed whereby a material, or impurity, is mixed with a semiconductor, e.g., silicon, to cause a light emitting diode (LED) in headend 101 to transmit light limited to a predetermined wavelength. Alternatively, tunable lasers may be employed, at least at headend 101, that provide specific wavelengths of transmission. An example of a tunable laser is an external cavity semiconductor diode laser (ECDL). To provide multi-color systems, headend 101 may include multiple lasers, each laser being tuned to a predetermined color. In a semiconductor laser, the tuning may be accomplished using dopants. When using a laser such as a semiconductor diode lasers, multiple lasers may be employed to provide the different colors while requiring only different doping in the manufacturing phase of each diode laser. It is also possible to tune the lasers to different wavelengths using filters or "Bragg" gratings in an optical transmission path. An example is a laser that uses Intel's Tunable Laser Technology featuring an External Cavity Laser, part number TTX11500, by Intel of Santa Clara, Calif. The laser may receive dopants during manufacture such that the optical output is of a predetermined wavelength.

Figure 2:
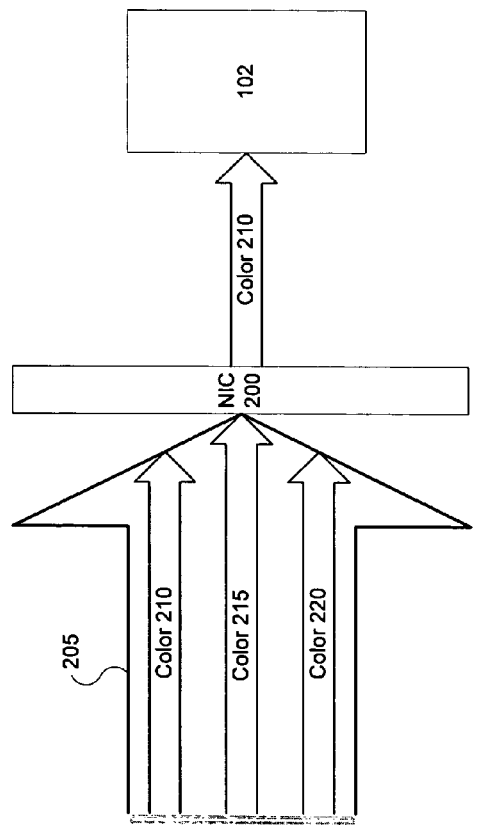
FIG. 2 illustrates use of a network interface card (NIC), according to an embodiment.

As described with reference to FIG. 2, devices 102, 104, 106, 108, etc. that are not configured to send and receive data according to the predetermined color used by headend 101 for transmitting data over network 100 cannot access information via network 100. FIG. 2 illustrates use of a network interface card (NIC) 200, according to an embodiment. NIC 200 is generally included in every device 102, 204, 106, 108, etc. attached to network 100. Further, NIC 200 is generally included in every device 102, 104, 106, 108, etc. present in a facility, e.g., a building, campus, etc., in which network 100 is operated. In particular, it should be understood that NIC 200 or a similar device for receiving only a specific color or colors is included in headend 101.

NIC 200 is specially manufactured to act as a filter that receives and provides to device 102, 104, 106, 108, etc. only data present on network 100 that is transmitted using predetermined wavelengths, e.g., the predetermined wavelengths used by headend 101 to transmit data. NIC 200 also generally includes an LED for transmitting only a specified color as described above with reference to headend 101. As mentioned above, in presently preferred embodiments a single predetermined wavelength is used, but embodiments are possible that use two or more predetermined wavelengths. An example of a similar NIC 200 would be a 100BaseFX PCI Fiber LAN Adapter, part number 098-1100FSCR, by Signamax Connectivity Systems/AESP, Inc., of North Miami, Fla. It will be understood that such a NIC would have to be modified such that the optical detector and transmitter would only receive and transmit respectively on a predetermine wavelength.

For example, a photon detector, known for absorbing photons and thereby producing electrons, may be included in NIC 200. Doping techniques may be applied to the photon detector to limit NIC 200 to receiving and providing to device 102, 104, 106, 108, etc. only data transmitted having a predetermined color, e.g., a predetermined color used by headend 101 to transmit data. Other techniques for limiting data received in NIC 200 may also be used, such as using an optical filter, a diffraction grating having physical properties to filter colors, etc. Photon detectors generally are associated with higher levels of quantum efficiency than optical filters and are therefore generally preferred. An example of a photodetector is model number VSC7750, by Vitesse of Camarillo, Calif. The photodector would then be required to be configured to receive only a predetermined frequency. Such a configuration may be performed using a filter. However, it is preferred to configure the detector directly using dopants in the manufacturing process making the detector selectively sensitive to the predetermined frequency.

As illustrated in FIG. 2, NIC 200 is connected to or included in a device such as computer 102 and may receive a data transmission 205 comprising one or more colors 210, 215, 220, etc. However, NIC 200 is configured only to detect and provide to computer 102 with data associated with a predetermined color 210. Accordingly, when other colors 215, 220, etc. are included in data transmission 205, data transmitted using such other colors 215, 220, etc., are not provided to computer 102, while data transmitted using predetermined color 210 is provided to computer 102.

Figure 3:
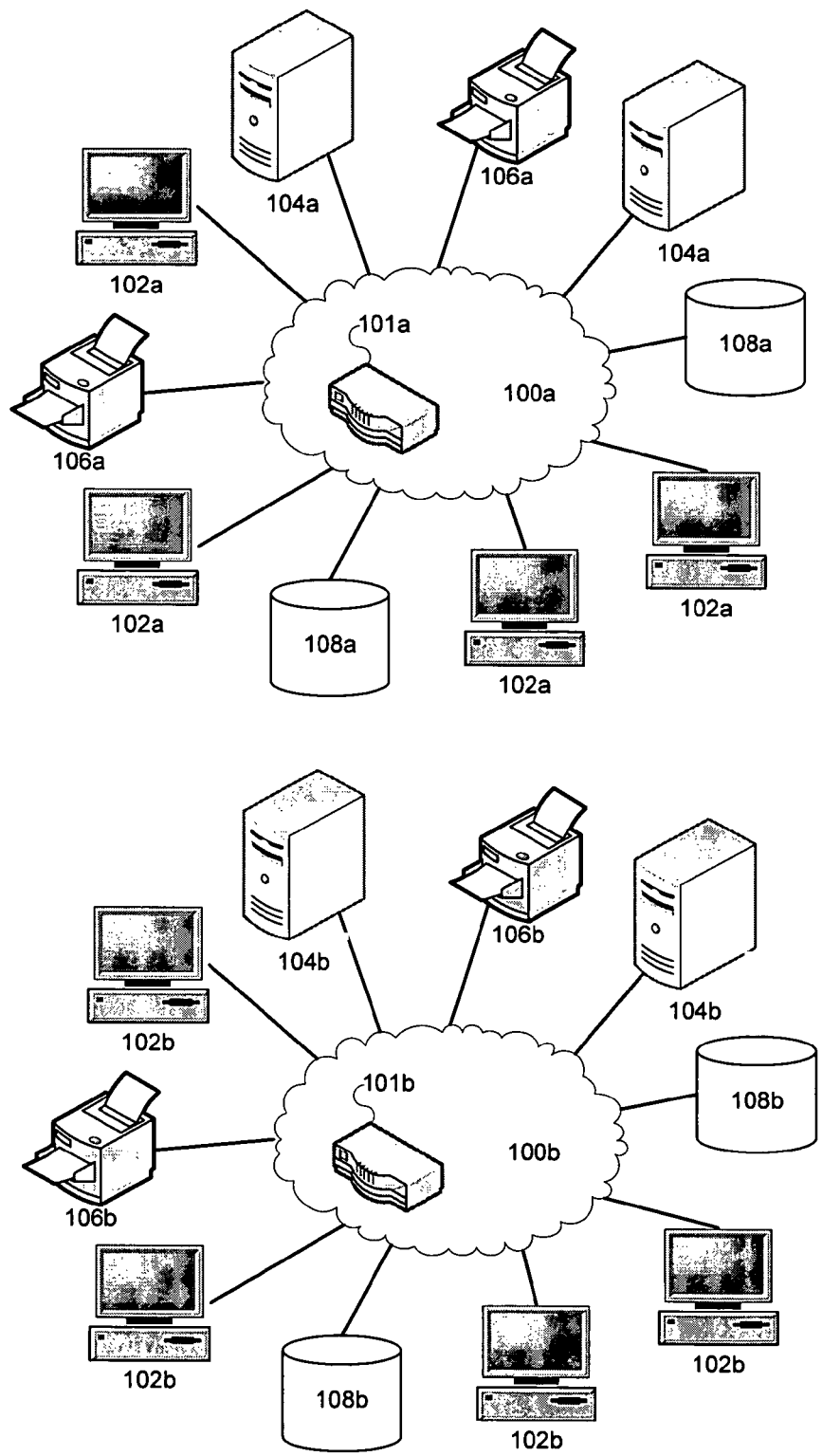
FIG. 3 illustrates certain embodiments including multiple broadband networks.

FIG. 3 illustrates certain embodiments including multiple broadband networks 100. Although FIG. 3 shows two networks 100, it should be understood that embodiments are contemplated which include more than two networks 100.

With reference to FIG. 3, Network 100a may be dedicated to a first level of information classification, and network 100b may be dedicated to a second level of information classification. It is intended that information classified according to the first level of information classification may not be available via network 100b, and information classified according to the second level of information classification may not be available over first network 100a. Network 100a includes a headend 101a configured to transmit and receive data using a first predetermined color. Network 100b included a headend 101b configured to transmit and receive data using a second predetermined color. Attached to network 100a are devices 102a, 104a, 106a, 108a, etc. that include NICs 200 that are configured to receive transmissions that use the first predetermined color. Attached to network 100b are devices 102b, 104b, 106b, 108b, etc. that include NICs 200 that are configured to receive transmissions that use the second predetermined color.

It is generally preferable that networks 100a and 100b are physically separated as one measure to prevent classified information from being improperly shared between networks 100. Where networks 100a and 100b are physically separated, there are no wires or cables connecting networks 100a and 100b or devices 102, 104, 106, 108, etc. attached respectively thereto. Further, physical separation of networks 100a and 100b preferably means, among other things, that networks 100a and 100b, and their respective devices 102, 104, 106, 108, etc. cannot communicate in any other way, such as wirelessly. However, when multiple networks 100 are located within the same area, such as a building, campus, or densely populated urban area, etc., it is possible and perhaps even likely that at some time a physical separation between networks 100 will be breached, e.g., whether intentionally or inadvertently a cable may be used to connect a device 102a intended to receive only unclassified information to a network 100b intended to transmit secret information. Advantageously, NICs 200 in devices 102a, 104a, 106a, 108a etc. in network 100a are configured only to receive a predetermined color used by headend 101a in network 100a, and accordingly such NICs 200 will not pass to devices 102a, 104a, 106a, 108a etc. in network 100a secret information received from network 100b, which information is transmitted using a second predetermined color used by headend 101b in network 100b.

In addition to the multiple networks 100 shown in FIG. 3, it should be understood that embodiments are possible that include a single network 100. For example, including multiple lasers in headend 101 as discussed above makes possible embodiments in which headend 101 transmits data using multiple colors depending on the destination for such data. That is, certain devices 102, 104, 106, and 108 in network 100 may be able to receive data only using a first predetermined color, while other devices 102, 104, 106, and 108 in network 100 may be able to receive data only using a second predetermined color etc. Accordingly, devices 102, 104, 106, and 108 associated with different communities of interest may be attached to network 100 and prevented from sharing data according to color of data transmissions.

Figure 4:
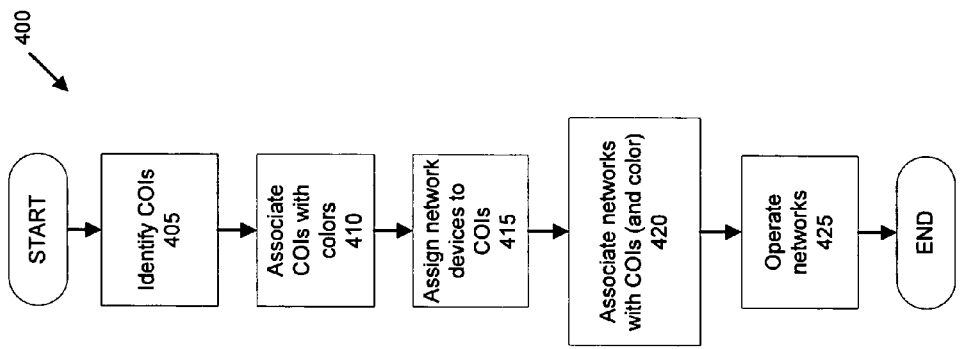
FIG. 4 illustrates a process for protecting information associated with a community of interest (COI), according to an embodiment.

FIG. 4 illustrates a process 400 for protecting information associated with a community of interest (COI), according to an embodiment.

In step 405, one or more COIs are identified. For example, as described above, different communities of interest could be identified as associated with unclassified, secret, and top secret information, respectively.

Next, in step 410, each COI identified in step 405 is associated with a color for the transmission of data over a network 100. That is, for each COI it is determined that information classified for access by members of the COI will be transmitted in network 100 at a predetermined wavelength.

Next, in step 415, network devices 102, 104, 106, 108, etc. are assigned to COIs associated with colors in step 410. That is, one or more devices 102, 104, 106, 108, etc. are each provided with a NIC 200 configured to receive and provide to a device 102, 104, 106, 108, etc. data received using a predetermined wavelength associated with a COI, and also to transmit data to headend 101 using that predetermined wavelength.

Next, in step 420, one or more networks 100 are each associated with one of the COIs identified is step 405 and associated with a color in step 410. Accordingly, headends 101 in networks 100 are configured to receive and transmit data only according to the color associated with the COI with which a network 100 has been associated.

Next, in step 425, devices 102, 104, 106, 108, etc. are attached to one or more networks 100 according to like associations with COIs as described above. In embodiments including multiple networks 100, connection of a device 102, 104, 106, 108, etc. to a network 100 associated with a different community of interest will thereby advantageously prevent information transmitted on the network 100 from being received by the device 102, 104, 106, 108, etc. Similarly, even in embodiments including only one network 100, attachment of devices 102, 104, 106, 108, etc. not associated with the COI associated with the network 100 will advantageously not result in information intended for the COI being shared with such devices 102, 104, 106, 108, etc.

Following step 425, process 400 ends.

In conclusion, with regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. Similarly, systems in certain embodiments could include elements not described herein, or could exclude certain elements that are described herein. In other words, the descriptions of processes, systems, methods, heuristics, etc. herein are provided for the purpose of illustrating certain embodiments, and should in no way be construed so as to limit the claimed invention.

In general, the foregoing description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the field of networks, and that the disclosed systems and methods will be incorporated into such future embodiments. In sum, it should be understood that the invention is capable of modification and variation and is limited only by the following claims.

What is claimed is:

1. A method, comprising:
    identifying, by a device, a first community of interest, the first community of interest being associated with information corresponding to a first level of confidentiality;
    determining, by the device and based on the information corresponding to the first level of confidentiality, a first wavelength used for transmitting and receiving data, via a first network, corresponding to the first level of confidentiality;
    associating, by the device, the identified community of interest with the determined first wavelength in the first network;
    configuring, by the device, the network to transmit data using only the determined first wavelength;
    identifying, by the device, at least one first network device that is associated with the first community of interest;
    configuring, by the device, the at least one first network device to receive only data transmitted using the determined first wavelength,
        the at least one first network device being connected to the first network, and
        the at least one first network device receiving only the data transmitted using the determined first wavelength;
    determining, by the device and based on a second level of confidentiality, a second wavelength, different than the determined first wavelength, used for transmitting and receiving data corresponding to the second level of confidentiality,
        the second level of confidentiality being different than the first level of confidentiality and being associated with a second community of interest that is different than the first community of interest;
    configuring, by the device, a second network to transmit data using only the determined second wavelength; and
    configuring, by the device, at least one second network device to receive only data transmitted using the determined second wavelength,
        the at least one second network device receiving only the data transmitted using the determined second wavelength.

2. The method of claim 1, where the at least one first network device comprises a plurality of network devices,
    the method further comprising:

configuring the plurality of network devices to receive only data transmitted using the determined first wavelength.

3. The method of claim 1, further comprising:
determining, based on the first level of confidentiality, a third wavelength, different than the determined first wavelength, that is used, by the at least one first network device, for transmitting data corresponding to the first level of confidentiality; and
configuring the at least one first network device to transmit data using only the determined second wavelength,
where the determined first wavelength and the determined third wavelength comprise a wavelength pair that is used, by the at least one first network device, for transmitting and receiving data corresponding to the first level of confidentiality.

4. The method of claim 1, further comprising:
determining, based on a second level of confidentiality, different than the first level of confidentiality, at least one third wavelength, different than the determined first wavelength, used for transmitting and receiving data corresponding to the third level of confidentiality;
configuring the first network to transmit data, corresponding to the third level of confidentiality, using the determined at least one third wavelength in addition to transmitting data transmitted using the determined first wavelength; and
configuring the at least one first network device to receive only data, corresponding to the third level of confidentiality, transmitted using the determined at least one third wavelength in addition to receiving only the data transmitted using the determined first wavelength,
the first network transmitting data, corresponding to the third level of confidentiality, using the determined at least one third wavelength.

5. The method of claim 1, where configuring the first network to transmit data using only the determined first wavelength includes:
providing the first network with a headend that includes an emitter that is capable of transmitting data using only the determined first wavelength,
the first network transmitting, sing the headend, the data using only the determined first wavelength.

6. The method of claim 1, where configuring the at least one first network device to receive only data transmitted using the determined first wavelength includes:
providing the at least one first network device with a network interface card; and
filtering and discarding, using the network interface card, all wavelengths other than the determined first wavelength from a data transmission.

7. The method of claim 6, where filtering by the network interface card is achieved by doping or through physical properties of a diffraction grating.

8. The method of claim 1, where the first community of interest is associated with a first information classification corresponding to the first level of confidentiality, and where the second community of interest is associated with a second information classification, different than the first information classification~corresponding to a second level of confidentiality.

9. The method of claim 8, where the first network and the second network are physically separated.

10. A system, comprising:
at least one first network device connected a first network, the first network transmitting data using only a first wavelength, the first wavelength being associated with a first community of interest that is associated with information corresponding to a first level of confidentiality, the first wavelength being determined based on the information corresponding to the first level of confidentiality,
the at least one first network device to:
receive, from a data transmission associated with a plurality of different wavelengths corresponding to a plurality of different levels of confidentiality, only data transmitted using the first wavelength, and
provide the received data, transmitted using the first wavelength, to at least one device in the first community of interest, the at least one network device being associated with the first community of interest; and at least one second network device connected to a second network,
the second network to transmit data using only a second wavelength, different than the first wavelength, the second wavelength being associated with a second community of interest that is associated with information corresponding to a second level of confidentiality, different than the first level of confidentiality, the second wavelength being determined based on the information corresponding to the second level of confidentiality,
the at least one second network device to receive only data transmitted using the second wavelength, the at least one second network device being associated with the second community of interest.

11. The system of claim 10, where the at least one network device comprises a plurality of network devices, and where the plurality of network devices receive only data transmitted using the first wavelength.

12. The system of claim 10, where the network is to receive only data transmitted using the first wavelength and the at least one network device is to transmit data, to the network, using only the first wavelength.

13. The system of claim 10,
where the at least first network device is to transmit data using only a third wavelength, different than the first wavelength, the third wavelength being based on the first level of confidentiality, and
where the first wavelength and the third wavelength comprise a wavelength pair that is used, by the at least one first network device, for transmitting and receiving data associated with the first level of confidentiality.

14. The system of claim 10, further comprising at least one network interface card, the at least one network interface card being connected to the at least one first network device, the at least one network interface card filtering all wavelengths of the plurality of different wavelengths, other than the first wavelength, from data the transmission.

15. The system of claim 14, where filtering by the network interface card is achieved by doping.

16. The system of claim 10, further comprising a headend, included within the first network, that includes an emitter to transmit only the first wavelength.

17. The system of claim 10, where the first community of interest is associated with a first information classification that is based on the first level of confidentiality, and where the second community of interest is associated with a second information classification that is based on the second level of confidentiality.

18. The system of claim 10, where the first network and the second network are physically separated.

19. A device comprising:
a memory to store instructions; and
a processor to execute the instructions to:

receive data from a data transmission associated with a plurality of different wavelengths that correspond to a plurality of different levels of confidentiality, filter the received data to obtain only filtered data transmitted using a first wavelength, the filtered data being received from a first network, the first network transmitting data using only a first wavelength, the first wavelength being associated with a first community of interest that is associated with information corresponding to a first level of confidentiality, the first wavelength being determined based on the information corresponding to the first level of confidentiality, and provide the filtered data to at least one device associated with the first community of interest, another device receiving, from a second network, only other data transmitted using a second wavelength that is different than the first wavelength, the second network transmitting data using only a second wavelength, different than the first wavelength, the second wavelength being associated with a second community of interest that is associated with information corresponding to a second level of confidentiality, different than the first level of confidentiality, the second wavelength being determined based on the information corresponding to the second level of confidentiality.

20. The device of claim 19, where the first network and the second network are physically separated.

21. The device of claim 19, where the first wavelength is determined based on a first information classification that is based on a first level of security, and where the second wavelength is determined based on a second information classification that is based on a second level of security, different than the first level of security.

* * * * *